United States Patent
Islam et al.

(10) Patent No.: US 9,955,392 B2
(45) Date of Patent: *Apr. 24, 2018

(54) METHODS AND APPARATUS FOR SELECTING A BASE STATION TRANSCEIVER SYSTEM BASED ON SERVICE COMMUNICATION TYPE

(71) Applicant: BlackBerry Limited, Waterloo (CA)

(72) Inventors: Muhammad Khaledul Islam, Kanata (CA); Asif Hossain, San Diego, CA (US)

(73) Assignee: BlackBerry Limited, Waterloo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/478,300

(22) Filed: Apr. 4, 2017

(65) Prior Publication Data

US 2017/0208517 A1 Jul. 20, 2017

Related U.S. Application Data

(63) Continuation of application No. 15/231,145, filed on Aug. 8, 2016, now Pat. No. 9,642,076, which is a
(Continued)

(51) Int. Cl.
*H04B 7/00* (2006.01)
*H04W 36/08* (2009.01)
(Continued)

(52) U.S. Cl.
CPC .......... *H04W 36/08* (2013.01); *H04B 17/336* (2015.01); *H04W 36/14* (2013.01); *H04W 36/30* (2013.01); *H04W 48/16* (2013.01)

(58) Field of Classification Search
USPC .................. 455/432.1–444, 550.1, 552.1
See application file for complete search history.

(56) References Cited

U.S. PATENT DOCUMENTS 5,159,625 A 10/1992 Zicker
5,613,213 A 3/1997 Naddell et al.
(Continued)

FOREIGN PATENT DOCUMENTS

EP 1076463 A2 2/2001
EP 1263254 A3 1/2003
(Continued)

OTHER PUBLICATIONS

European Telecommunications Standards Institute, "Digital Cellular Telecommunications System (Phase 2+); Radio Subsystem Link Control", Global System for Mobile Communications, Jul. 2000, vol. 8.5.0, ETSI, Sophia Antipolis Cedex—France.

*Primary Examiner* — Fayyaz Alam
(74) *Attorney, Agent, or Firm* — Moffat & Co.

(57) ABSTRACT

Techniques for use in selecting a base station transceiver system for communication with a mobile station are described. The mobile station is connected to a first base station transceiver system, and scans to identify a second base station transceiver system for communication. The mobile station further identifies that the second base station transceiver system provides a predetermined communication service, and that the first base station transceiver system fails to provide the predetermined communication service. In response to identifying, the mobile station causes the second base station transceiver system to be selected for communication over the first base station transceiver system even if the signal quality of the second base station transceiver system is worse than that of the first base station transceiver system. Identifying whether the first and second base station transceiver system provide the predetermined communication service is based on parameters transmitted from the first and second base station transceiver systems.

20 Claims, 4 Drawing Sheets

Related U.S. Application Data continuation of application No. 14/740,978, filed on Jun. 16, 2015, now Pat. No. 9,414,278, which is a continuation of application No. 13/951,101, filed on Jul. 25, 2013, now Pat. No. 9,072,034, which is a continuation of application No. 13/164,419, filed on Jun. 20, 2011, now Pat. No. 8,504,094, which is a continuation of application No. 10/693,346, filed on Oct. 24, 2003, now Pat. No. 7,970,429.

(51) Int. Cl.
    *H04W 36/14*     (2009.01)
    *H04W 48/16*     (2009.01)
    *H04B 17/336*     (2015.01)
    *H04W 36/30*     (2009.01)

(56) References Cited

U.S. PATENT DOCUMENTS

| | | |
|---|---|---|
| 5,722,070 A | 2/1998 | Alford |
| 5,734,980 A | 3/1998 | Hooper et al. |
| 5,832,367 A | 11/1998 | Bamburak et al. |
| 5,915,219 A | 6/1999 | Poyhonen |
| 6,047,183 A | 4/2000 | Kingdon et al. |
| 6,625,451 B1 | 9/2003 | La Medica, Jr. et al. |
| 6,931,249 B2 | 8/2005 | Fors et al. |
| 2002/0087674 A1 | 7/2002 | Guilford et al. |
| 2002/0090975 A1 | 7/2002 | Laiho et al. |
| 2003/0013443 A1 | 1/2003 | Willars et al. |
| 2003/0114158 A1 | 6/2003 | Soderbacka et al. |
| 2003/0129971 A1 | 7/2003 | Gopikanth |
| 2004/0097233 A1 | 5/2004 | Pecen et al. |
| 2004/0109431 A1 | 6/2004 | Abrahamson et al. |
| 2004/0142693 A1* | 7/2004 | Feder et al. .................. 455/443 |
| 2004/0266438 A1 | 12/2004 | Bjelland et al. |
| 2005/0032542 A1 | 2/2005 | Wilborn et al. |
| 2005/0037755 A1 | 2/2005 | Hind et al. |
| 2005/0059397 A1 | 3/2005 | Zhao |
| 2006/0075090 A1 | 4/2006 | Bocking et al. |

FOREIGN PATENT DOCUMENTS

| | | |
|---|---|---|
| WO | 0122764 A1 | 3/2001 |
| WO | 0147316 A2 | 6/2001 |

\* cited by examiner

METHODS AND APPARATUS FOR SELECTING A BASE STATION TRANSCEIVER SYSTEM BASED ON SERVICE COMMUNICATION TYPE

CROSS-REFERENCE TO RELATED APPLICATION

The present application is a continuation of and claims priority to U.S. non-provisional patent application having application Ser. No. 15/231,145, filed Aug. 8, 2016, which is a continuation of U.S. non-provisional application Ser. No. 14/740,978, filed Jun. 16, 2015, now U.S. Pat. No. 9,414,278, which is a continuation of U.S. non-provisional application Ser. No. 13/951,101, filed Jul. 25, 2013, now U.S. Pat. No. 9,072,034, which is a continuation of U.S. non-provisional application Ser. No. 13/164,419, filed Jun. 20, 2011, now U.S. Pat. No. 8,504,494, which is a continuation of and claims priority to U.S. non-provisional patent application having application Ser. No. 10/693,346 and filing date of 24 Oct. 2003, now U.S. Pat. No. 7,970,429, which are all hereby incorporated by reference herein.

BACKGROUND

Field of the Invention

The present invention relates generally to mobile stations and base station transceiver systems, and more particularly to the selection of base station transceiver systems based on service communication type (e.g. 2G or 3G communication service).

Description of the Related Art

A wireless communication device, such as a cellular telephone or mobile station, is often capable of making and receiving voice calls and/or sending and receiving data over a wireless communication network. Before it is able to do this, the cellular mobile station selects, acquires, and registers with one of a plurality of communication networks which are available within a given geographic coverage area. After registering with the selected network, the mobile station operates in an idle mode where it "camps-on" a particular wireless communication channel of the network to monitor for its calls or messages. The mobile station also monitors for the availability of other preferred systems and performs "handoffs" to these systems if necessary. "Network selection" is the process performed by the mobile station for selecting the communication network with which to communicate.

Base station transceiver systems may be coupled to different networks which may provide different services for a mobile station. Third Generation (3G) wireless networks provide for high speed packet data services, a big improvement over earlier developed circuit-switched wireless networks. As is well documented, 3G services are typically associated with Universal Mobile Telecommunications System (UMTS), Enhanced Data for Global Evolution (EDGE), Wideband Code Division Multiple Access (WCDMA), and CDMA2000 (1×RTT, 1×EV-DO, and 1×EV-DV) technologies. On the other hand, Second Generation (2G) communication service is a circuit-switched based system and is associated with basic CDMA (e.g. CDMAone), Time Division Multiple Access (TDMA), and GSM technologies. 2G typically provides a service that is less than 65 kilobits per second (kbps). 2.5 Generation (2.5G) service was established as a bridge to transition from 2G to 3G and is typically associated with CDMA2000 (1×) and General Packet Radio Service (GPRS) technologies. All of the above technologies proceed the primarily "analog" or First Generation (1G) service, which is generally associated with Advanced Mobile Phone Service (AMPS).

Using conventional techniques, a mobile station performs network selection based on information on a Subscriber Identity Module (SIM) card, a Removable User Identity Module (R-UIM), or a Preferred Roaming List (PRL) that resides in non-volatile memory. This information is typically programmed by a service provider and provides the mobile station with various system selection criteria, such as which systems the mobile station should attempt to acquire first, which systems are preferred over others, which systems are roaming systems, etc. The selection criteria are usually quite restrictive and do not take into account the primary service that a particular mobile station is expected to provide.

In contrast to standard cellular telephones, other types of portable devices such as personal digital assistants (PDAs), laptop computers, and portable e-mail devices, are better known to provide for the organization and management of text, files, messages, and/or other data. However, wireless data communication services, such as wireless e-mail and Internet access services, are becoming more and more popular in connection with such devices. Mobile stations providing for combined capabilities (e.g. both voice and advanced data communication) also exist and are becoming increasingly popular.

In order to operate fully as intended, these mobile stations must have the appropriate communication services supported and made available by the communication network that it is registered with. Ideally, a communication system should support and make available all the different types of communication services that a mobile station is capable of providing for the ultimate benefit of the end user. In practice, however, a given communication network can only provide services that are defined with the standard that it conforms to. For example, a 2G communication network cannot provide all services defined in 3G. However, there may be other communication networks in the same geographical area which conform to a more advanced standard and provide services that are more suitable for the mobile station.

As apparent, conventional network selection does not take into consideration the availability of different service offerings in the decision-making process. As a result, an inadequate communication network may be selected by the mobile station. For example, a mobile station may select a communication network that provides an acceptable voice service (a circuit-switched data service) but not a high speed packet data service despite the availability of another adequate network capable of providing both the voice and the high speed packet data service in the same geographical region. Such conventional operation is undesirable, especially for application-specific mobile stations (e.g. portable wireless e-mail devices).

As a particular illustrative example, one conventional network selection criteria defined by CDMA service providers involves a preference to select and communicate with a base station transceiver system of a Personal Communication Service (PCS) band (i.e. a 1900 MHz band) over that of a standard cellular network band (i.e. a 800 MHz band). However, the preferred PCS band may or may not offer a 3G service. In fact, the PCS network may provide a 2G service and the standard cellular band may offer a 3G service. In such a case, a conventional mobile station will not provide the data service (e.g. a high speed packet data service) to the end user even though it is available in the region. Furthermore, there could be other beneficial features in a 3G network, such as a "quick paging channel" in a 1×RTT network. Usage of the quick paging channel can significantly increase the standby battery life of the mobile station. In certain 2G/3G boundaries, however, if the mobile station is using conventional network selection methods that do not take into account the protocol revision of the transceiver system, the mobile station may end up in a "more preferred" 2G network and lose the benefit of the quick paging channel. The reverse may also be true in terms of band preference, since it depends on the band available to the service provider.

Accordingly, there is a resulting need for mobile station methods and apparatus for selecting a communication network that overcome the deficiencies of the prior art.

SUMMARY

Methods and apparatus for selecting a base station transceiver system based on service communication type are described. In one illustrative example, one or more base station transceiver systems are identified for communication with the mobile station through a scanning process. A first base station transceiver system is identified as providing a Third Generation (3G) communication service or better, whereas a second base station transceiver system is identified as failing to provide the 3G or better communication service (e.g. it may provide a Second Generation (2G) communication service). The first system is selected for communication over the second system based at least in part on identifying that the second system fails to provide the 3G or better communication service. For example, the first system may be chosen over the second system if the first system has a signal quality that is better than a minimum threshold, even if its signal quality is worse than that of the second system.

Advantageously, even if a surrounding 2G system has a better signal quality, preference for an adequate 3G or better system is given to ensure that a preferred data service is made available to the mobile station.

BRIEF DESCRIPTION OF THE DRAWINGS

Embodiments of present invention will now be described by way of example with reference to attached figures, wherein.

DETAILED DESCRIPTION OF THE PREFERRED EMBODIMENTS

In the techniques described herein, one or more base station transceiver systems are identified for communication with the mobile station through a scanning process. A first base station transceiver system is identified as providing a 3G communication service or better, whereas a second base station transceiver system is identified as failing to provide the 3G or better communication service (e.g. it may provide a 2G communication service). The first system is selected for communication over the second system based at least in part on identifying that the second system fails to provide the 3G or better communication service. In another illustrative example of the present techniques, the mobile station identifies a base station transceiver system that fails to provide a predetermined digital communication service (e.g. a 3G or better service). The mobile station produces and sends a list of one or more handoff candidate identifiers to a serving base station transceiver system which excludes an identifier for the system based on its failure to provide the predetermined digital communication service. Advantageously, even if a surrounding 2G system has a better signal quality, preference for an adequate 3G or better system is given to ensure that more preferred services of 3G is made available to the mobile station.

Figure 1:
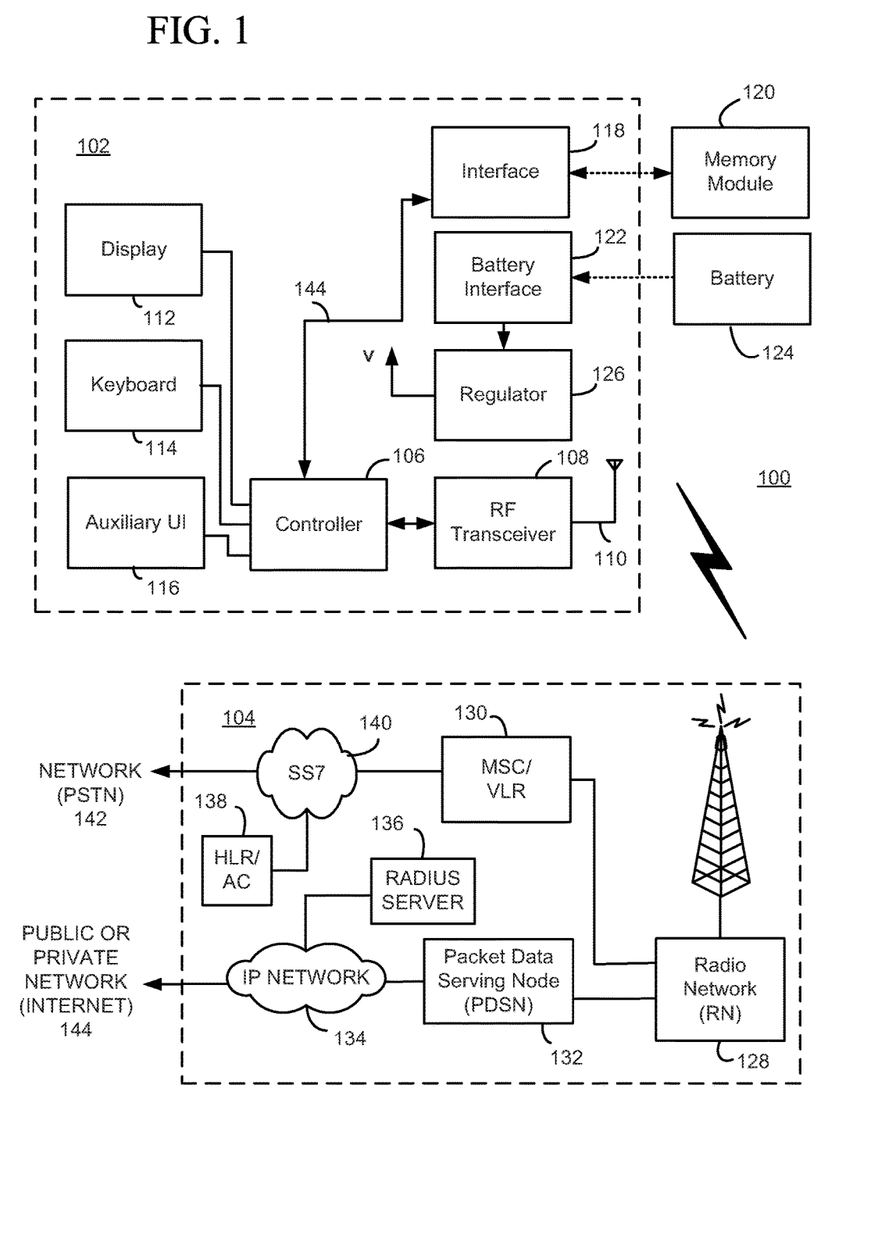
FIG. 1 is a block diagram which illustrates pertinent components of a Code Division Multiple Access (CDMA) wireless communication network and a mobile station which communicates within this network.

FIG. 1 is a block diagram of a communication system 100 which includes a mobile station 102 which communicates through a wireless communication network 104. Mobile station 102 preferably includes a visual display 112, a keyboard 114, and perhaps one or more auxiliary user interfaces (UI) 116, each of which is coupled to a controller 106. Controller 106 is also coupled to radio frequency (RF) transceiver circuitry 108 and an antenna 110.

Typically, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from network 104 over a wireless link via antenna 110. RF transceiver circuitry 108 performs functions similar to those of a radio network (RN) 128, including for example modulation/demodulation and possibly encoding/decoding and encryption/decryption. It is also contemplated that RF transceiver circuitry 108 may perform certain functions in addition to those performed by RN 128. It will be apparent to those skilled in art that RF transceiver circuitry 108 will be adapted to particular wireless network or networks in which mobile station 102 is intended to operate.

Mobile station 102 includes a battery interface 122 for receiving one or more rechargeable batteries 124. Battery 124 provides electrical power to electrical circuitry in mobile station 102, and battery interface 122 provides for a mechanical and electrical connection for battery 124. Battery interface 122 is coupled to a regulator 126 which regulates power to the device. When mobile station 102 is fully operational, an RF transmitter of RF transceiver circuitry 108 is typically keyed or turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Mobile station 102 operates using a memory module 120, such as a Subscriber Identity Module (SIM) or a Removable User Identity Module (R-UIM), which is connected to or inserted in mobile station 102 at an interface 118. As an alternative to a SIM or an R-UIM, mobile station 102 may operate based on configuration data programmed by a service provider into memory module 120 which is a non-volatile memory. Mobile station 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 202 of FIG. 2.

Mobile station 102 communicates in and through wireless communication network 104. In the embodiment of FIG. 1, wireless network 104 is a Third Generation (3G) supported network based on Code Division Multiple Access (CDMA) technologies. In particular, wireless network 104 is a CDMA2000 network which includes fixed network components coupled as shown in FIG. 1. Wireless network 104 of the CDMA2000-type includes a Radio Network (RN) 128, a Mobile Switching Center (MSC) 130, a Signaling System 7 (SS7) network 140, a Home Location Register/Authentication Center (HLR/AC) 138, a Packet Data Serving Node (PDSN) 132, an IP network 134, and a Remote Authentication Dial-In User Service (RADIUS) server 136. SS7 network 140 is communicatively coupled to a network 142 (such as a Public Switched Telephone Network or PSTN), whereas IP network is communicatively coupled to a network 144 (such as the Internet).

During operation, mobile station 102 communicates with RN 128 which performs functions such as call-setup, call processing, and mobility management. RN 128 includes a plurality of base station transceiver systems that provide wireless network coverage for a particular coverage area commonly referred to as a "cell". A given base station transceiver system of RN 128, such as the one shown in FIG. 1, transmits communication signals to and receives communication signals from mobile stations within its cell. The base station transceiver system normally performs such functions as modulation and possibly encoding and/or encryption of signals to be transmitted to the mobile station in accordance with particular, usually predetermined, communication protocols and parameters, under control of its controller. The base station transceiver system similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks. The underlying services may also differ based on its particular protocol revision.

The wireless link shown in communication system 100 of FIG. 1 represents one or more different channels, typically different radio frequency (RF) channels, and associated protocols used between wireless network 104 and mobile station 102. An RF channel is a limited resource that must be conserved, typically due to limits in overall bandwidth and a limited battery power of mobile station 102. Those skilled in art will appreciate that a wireless network in actual practice may include hundreds of cells depending upon desired overall expanse of network coverage. All pertinent components may be connected by multiple switches and routers (not shown), controlled by multiple network controllers.

For all mobile station's 102 registered with a network operator, permanent data (such as mobile station 102 user's profile) as well as temporary data (such as mobile station's 102 current location) are stored in a HLR/AC 138. In case of a voice call to mobile station 102, HLR/AC 138 is queried to determine the current location of mobile station 102. A Visitor Location Register (VLR) of MSC 130 is responsible for a group of location areas and stores the data of those mobile stations that are currently in its area of responsibility. This includes parts of the permanent mobile station data that have been transmitted from HLR/AC 138 to the VLR for faster access. However, the VLR of MSC 130 may also assign and store local data, such as temporary identifications. Mobile station 102 is also authenticated on system access by HLR/AC 138. In order to provide packet data services to mobile station 102 in a CDMA2000-based network, RN 128 communicates with PDSN 132. PDSN 132 provides access to the Internet 144 (or intranets, Wireless Application Protocol (WAP) servers, etc.) through IP network 134. PDSN 132 also provides foreign agent (FA) functionality in mobile IP networks as well as packet transport for virtual private networking. PDSN 132 has a range of IP addresses and performs IP address management, session maintenance, and optional caching. RADIUS server 136 is responsible for performing functions related to authentication, authorization, and accounting (AAA) of packet data services, and may be referred to as an AAA server.

Those skilled in art will appreciate that wireless network 104 may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviours at the wireless link.

Figure 2:
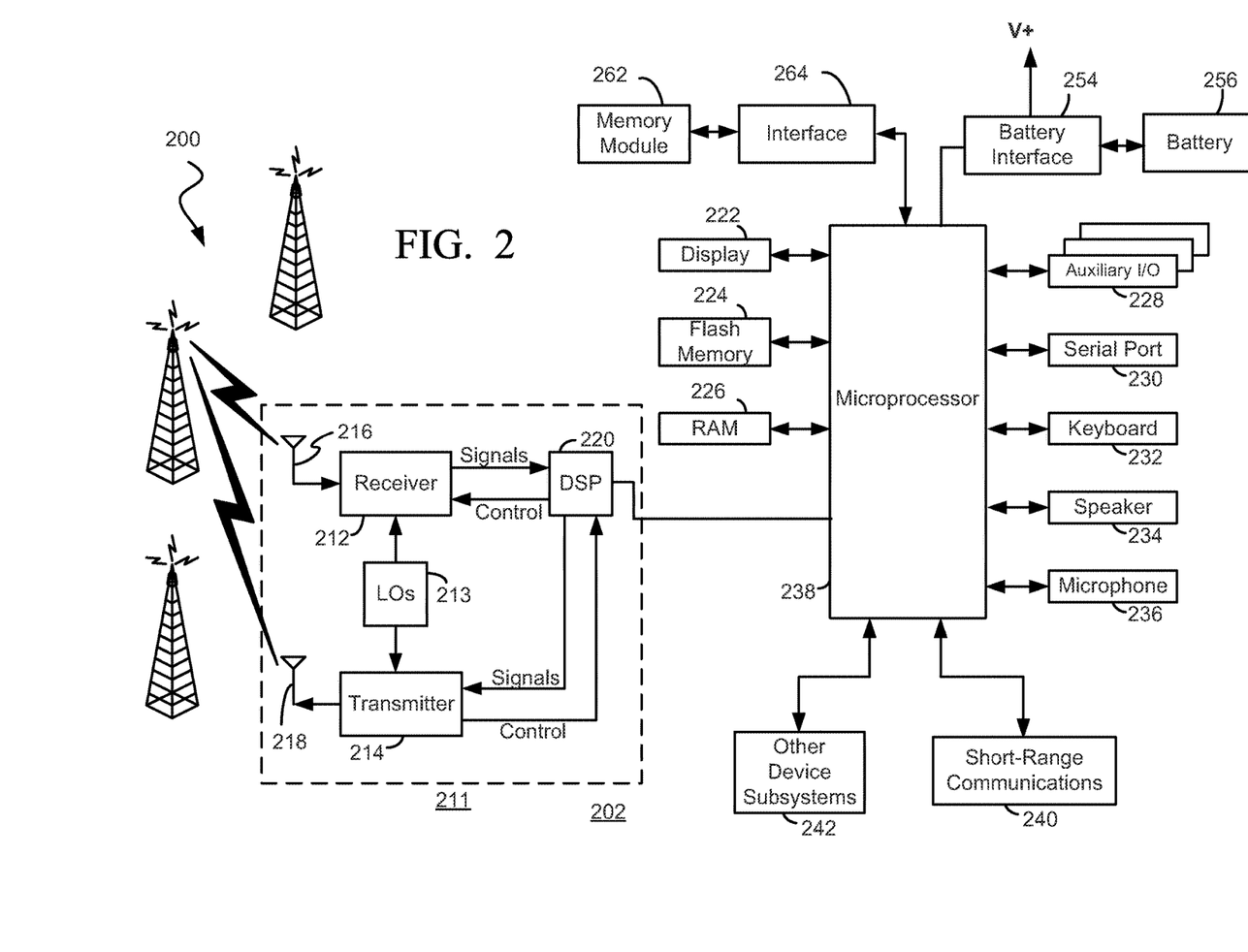
FIG. 2 is a more detailed diagram of the mobile station which may communicate with one of a plurality of different base station transceiver systems which provide services such as a Second Generation (2G) communication service or a Third Generation (3G) or better communication service.

FIG. 2 is a detailed block diagram of a preferred mobile station 202. Mobile station 202 is preferably a two-way communication device having at least voice and advanced data communication capabilities (i.e. 3G-capable), including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of base station transceiver systems 200 within its geographic coverage area. Mobile station 202 selects or helps select which one of base station transceiver systems 200 it will communicate with (e.g. one providing a 3G-service), as will be described in more detail later in relation to FIGS. 3 and 4.

Mobile station 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Mobile station 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 requires a memory module 262, such as a Subscriber Identity Module or "SIM" card or a Removable User Identity Module (R-UIM), to be inserted in or connected to an interface 264 of mobile station 202 in order to operate in the network. Alternatively, memory module 262 may be a non-volatile memory which is programmed with configuration data by a service provider so that mobile station 202 may operate in the network. Since mobile station 202 is a mobile battery-powered device, it also includes a battery interface 254 for receiving one or more rechargeable batteries 256. Such a battery 256 provides electrical power to most if not all electrical circuitry in mobile station 202, and battery interface 254 provides for a mechanical and electrical connection for it. The battery interface 254 is coupled to a regulator (not shown in FIG. 2) which provides power V+ to all of the circuitry.

Mobile station 202 includes a microprocessor 238 (which is one implementation of controller 106 of FIG. 1) which controls overall operation of mobile station 202. This control includes network selection techniques of the present application. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications (such as a network re-establishment scheme), will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 256 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238.

Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

Figure 3:
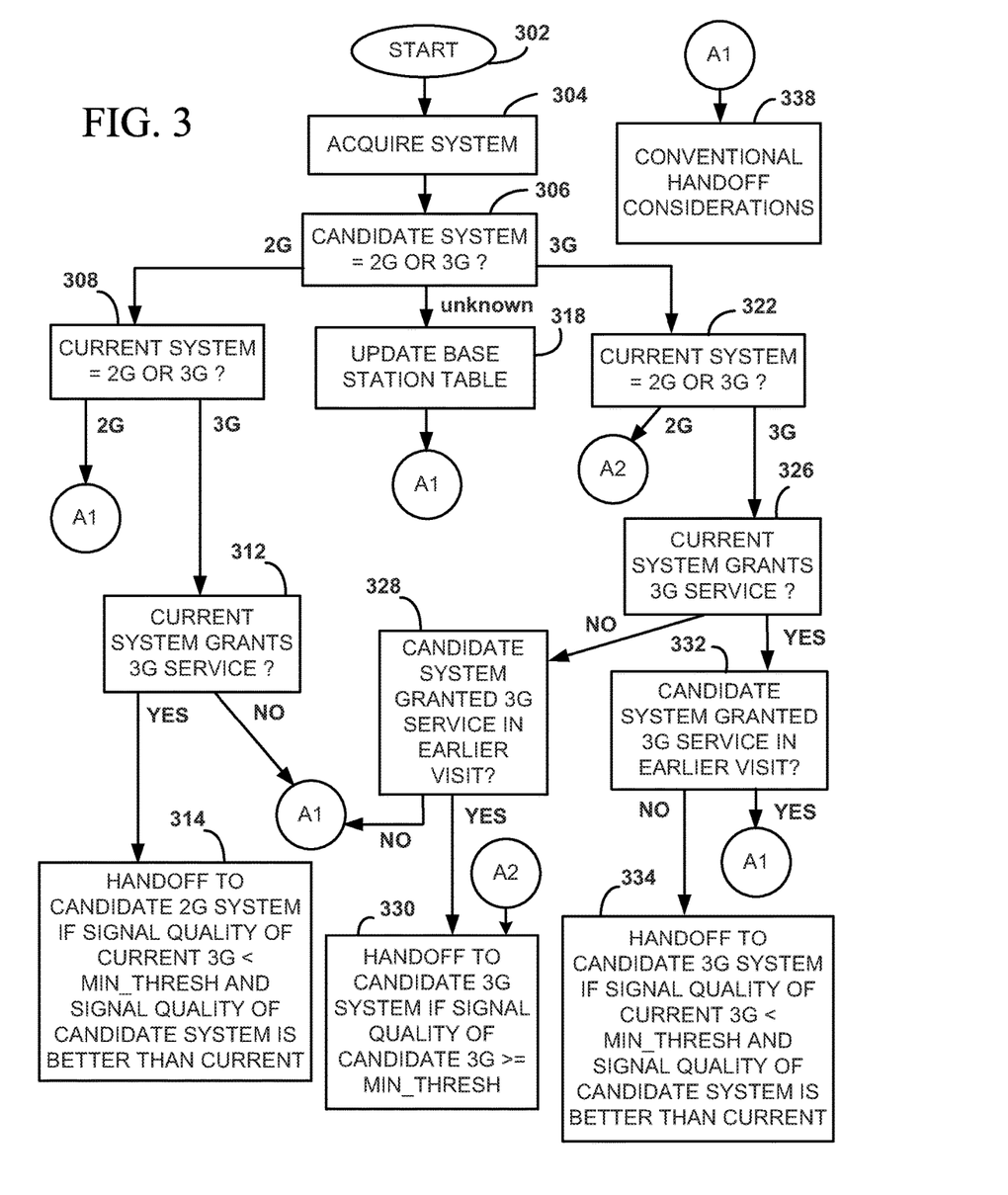
FIG. 3 is a flowchart which describes a method of selecting a base station transceiver system for communication based on service communication type.

FIG. 3 is a flowchart which describes a mobile station method of selecting a base station transceiver system with a preference for 3G services (e.g. packet data services) over 2G services during an idle mode of the mobile station. Although the method of FIG. 3 will be described with respect to a single candidate system under consideration for illustrative clarity, it may be employed for a plurality of candidate systems under simultaneous consideration. Prior to the steps described in relation to FIG. 3, the mobile station scans a geographic coverage area to identify one or more available candidate base station transceiver systems with which it may communicate. In CDMA, each Radio Network (RN) includes multiple base station transceiver systems which are identified by the phase of a Pseudorandom Noise (PN) code. Thus, the mobile station scans for PNs on a number of different frequencies as directed by its Preferred Roaming List (PRL) in its R-UIM or non-volatile memory.

From a start block 302, the mobile station acquires a system in accordance with its PRL and roaming settings (step 304). The mobile station may alternatively acquire a system in step 304 that is not in the PRL by means of idle handoff and channel hashing, for example. This initially acquired system may be, for example, a 2G system or a 3G system, and may not even be a preferred system. After system acquisition, the mobile station begins to periodically scan for systems that may be more suitable for its primary service (e.g. packet data service) or new geographic location. This periodic scanning could be the result of a periodic reselection process when the mobile station is in a less preferred system per its PRL, or merely the result of a neighbor system search during every wake-up period from sleep mode (a list of the neighboring base stations is provided by the current base station transceiver system).

During its scanning, the mobile station maintains a table of system information for candidate and neighboring base station transceiver systems. This table is created based on operational observations and data actually received from most if not all systems including previously acquired systems. The mobile station also measures various metrics of signal quality of the current system as well as its candidate and neighboring systems in the table. In CDMA, the signal strength is typically determined based on a plurality of measured parameters, such as the total received power of the spectrum, chip energy of the pilot channel over total noise ($E_c/I_o$), etc. Typically, the pilot channel $E_c/I_o$ is used as the measure of signal quality of the system.

In accordance with the present application, and as will be described in detail, the criteria for considering a candidate system to be "better" than the current system for handoff purposes depends on whether the transition is from 2G to 3G or vice versa, the relative signal strengths of the systems, knowledge of the actual data service access in the 3G system, and so on. Thus, after the initial system is acquired at step 304, the mobile station identifies whether a candidate system is one that is associated with a Second Generation (2G) communication service or a Third Generation (3G) communication service (step 306). If the candidate system is associated with the 2G service, the flowchart follows the "2G" branch from step 306. If the candidate system is associated with the 3G service, the flowchart follows the "3G" branch from step 306.

If the candidate system is associated with the 2G service at step 306, then the "2G" branch from step 306 is followed where the mobile station identifies whether the current system is one that is associated with 2G or 3G (step 308). If the current system is associated with 2G, then the "2G" branch from step 308 is followed where the mobile station will consider conventional handoff techniques (step 338 through a connector A1). When conventional handoff techniques are considered at step 338, the mobile station facilitates a handoff to the candidate system if its signal quality is stronger than the signal quality of the current system. Conversely, if the signal quality of the candidate system is not better than that of the current system, then a handoff to the candidate system is not initiated and communication is maintained with the current system. In the present embodiment, the signal quality of the candidate system is better or greater than that of the current system if the candidate's system is at least 2 dB greater than that of the current system.

If the current system is associated with 3G as identified in step 308, however, the "3G" branch from step 308 is followed. Here, the mobile station identifies whether the current system actually grants 3G service (step 312). If the current system does not actually grant 3G service, then the mobile station considers conventional handoff techniques as described above (step 338 through connector A1). If the current system does indeed grant 3G service as tested at step 312, however, the mobile station facilitates a handoff to the candidate 2G system only if the signal quality of the current 3G system is less than a minimum threshold ("MIN_T-HRESH") and the signal quality of the candidate 2G system is greater than that of the current 3G system (step 314). Conversely in step 314, if the signal quality of the current 3G system is greater than or equal to the minimum threshold, or the signal quality of the candidate 2G system is less than the current 3G system, a handoff to the candidate 2G system is not initiated and communication is maintained with the current 3G system. Based on the above, the mobile station will maintain communication with the current 3G system even if its signal strength is worse than the signal strength of the candidate 2G system, as long as the current 3G system is greater than or equal to the minimum threshold.

Preferably, the minimum threshold represents a relatively low but nonetheless acceptable and suitable signal quality for communication in a system that provides the desired services to the mobile station. For example, the minimum threshold can be set to −12 dB if $E_c/I_o$ is used as the measure of signal quality. Any suitable signal threshold may be utilized, however, preferably within the range of between −10 and −14 dB.

In step 306, if the candidate system is associated with the 3G service then the "3G" branch from step 306 is followed. In this case, the mobile station identifies whether the current system is associated with 2G or 3G (step 322). If the current system is associated with 2G as identified at step 322, then the "2G" branch from step 322 is followed to step 330 through a connector A2. At step 330, the mobile station facilitates a handoff to the candidate 3G system if its signal quality is greater than or equal to a minimum threshold ("MIN_THRESH" in step 330). Conversely, if the signal quality of the candidate 3G system is less than the minimum threshold, a handoff to the candidate 3G system is not initiated and communication is maintained with the current system. In the present embodiment, the minimum threshold is −14 dB (i.e. the same threshold as that used in step 314). Based on the above, the mobile station will handoff to the candidate 3G system even if its signal quality is worse than that of the current system, as long as the candidate 3G system is greater than or equal to the minimum threshold.

In step 322, if the current system is associated with the 3G service then the "3G" branch from step 322 is followed. Here, the mobile station identifies whether the current system actually grants 3G service or not (step 326). If the current system does not grant 3G service as identified in step 326, then the mobile station identifies whether the candidate system was previously granted 3G service in an earlier visit (step 328). If not, then the mobile station considers conventional handoff techniques as described above (step 338 through connector A1). If the candidate system was previously granted 3G service as identified in step 328, then the mobile station facilitates a handoff to the candidate 3G system if its signal quality is greater than or equal to a minimum threshold (step 330). Conversely in step 330, if the signal quality of the candidate 3G system is less than the minimum threshold, a handoff to the candidate 3G system is not initiated and communication is maintained with the current system. In the present embodiment, the minimum threshold is −14 dB (i.e. the same threshold as that used in step 314). Based on the above, the mobile station will again handoff to the candidate 3G system even if its signal quality is worse than that of the current system, as long as the candidate 3G system is greater than or equal to the minimum threshold.

In step 326, if the current system grants 3G service then the mobile station identifies whether the candidate system was previously granted 3G service in an earlier visit (step 332). If so, then the mobile station considers conventional handoff techniques as described above (step 338 through connector A1). If the candidate system was never previously granted 3G service as identified in step 332, then the mobile station facilitates a handoff to the candidate 3G system if the signal quality of the current 3G system is less than the minimum threshold and the signal quality of the candidate system is stronger than the current 3G system (step 334). Conversely in step 334, if the signal quality of the current 3G system is greater than or equal to the minimum threshold, or the signal quality of the candidate 3G system is less than the current 3G system, a handoff to the candidate 3G system is not initiated and communication is maintained with the current 3G system.

In step 306, if the candidate system is not listed in the table of systems that the mobile station maintains, it is unknown whether the candidate system is associated with a 2G or 3G service. In this case, the "unknown" branch from step 306 is followed. The candidate system's service status (i.e. 2G or 3G) is identified and the table of system information is updated with this and other appropriate information regarding the base station transceiver system (step 318). The mobile station considers conventional handoff techniques regarding the current and candidate systems (step 338 through a connector A1).

Figure 4:
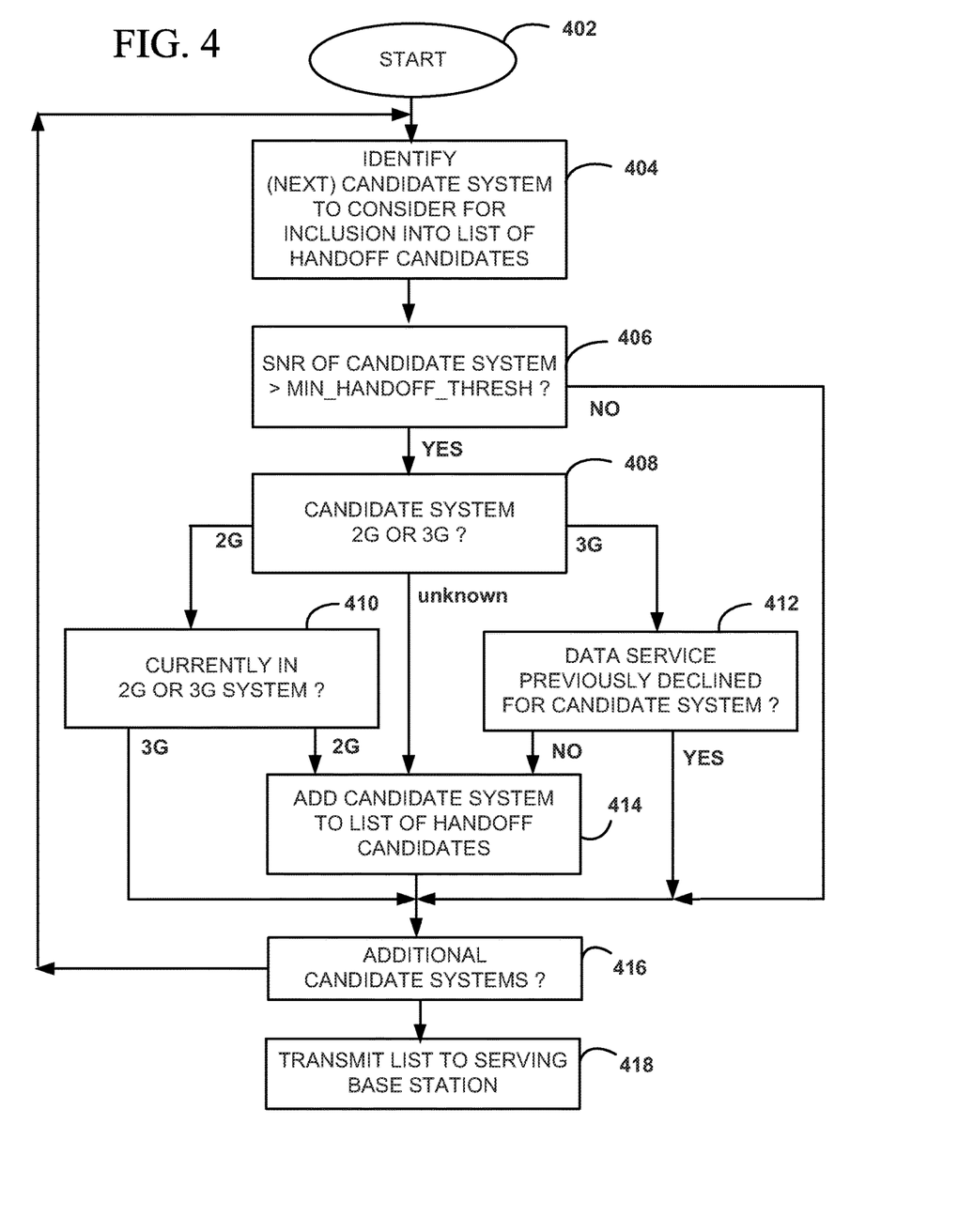
FIG. 4 is a flowchart which describes an additional method of selecting a base station transceiver system for communication based on service communication type.

Thus, according to the method of FIG. 4, one or more base station transceiver systems are identified for communication with the mobile station through a scanning process. A first base station transceiver system is identified as providing a 3G or better communication service, whereas a second base station transceiver system is identified as failing to provide the 3G or better communication service (e.g. it may provide a 2G communication service). The first system is selected for communication over the second system based at least in part on identifying that the second system fails to provide the 3G or better communication service. Advantageously, even if a surrounding 2G system has a better signal quality, preference for an adequate 3G or better system is given to ensure that a preferred 3G service (e.g. high speed packet data service or quick paging) is made available to the mobile station.

FIG. 4 is a flowchart which describes a method of selecting a base station transceiver system for communication with the mobile station during an access or traffic state of the mobile station. The method described in relation to FIG. 4 relates to the creation of an identifying list of candidate base station transceiver systems available for handoff and communication with the mobile station. This handoff candidate list of base station transceiver system identifiers is transmitted in a message by the mobile station to a serving base station transceiver system. The list may be transmitted in a message such as an Origination Message, a Page Response Message during a call setup (i.e. access state), and a Pilot Strength Measurement Message (PSMM) during a handoff request (i.e. traffic state), as examples. After transmission, the mobile station will be handed-off to and communicate with a base station transceiver system that is ultimately selected by the network.

Prior to the steps described in relation to FIG. 4, the mobile station scans a geographic coverage area to identify one or more available candidate base station transceiver systems (or available candidate "PNs") with which it may communicate. Beginning at a start block 402, the mobile station identifies a candidate system to consider for inclusion into the handoff candidate list of base station transceiver system identifiers (step 404). The mobile station identifies whether a signal quality of the candidate system is greater than or equal to a minimum handoff threshold ("MIN_HANDOFF_THRESH") (step 406). If the candidate system is less than the minimum handoff threshold, an identifier for the candidate system is not included in the list ("NO" branch from step 406). The mobile station identifies whether there are additional candidate systems to consider (step 416); if so, the flowchart continues again at step 404.

If the signal quality of the candidate system is greater than or equal to the minimum handoff threshold in step 406, however, the mobile station will proceed to consider including it into the list. In particular, the mobile station identifies whether the candidate system is associated with a Second Generation (2G) communication service or a Third Generation (3G) communication service (step 408). If the candidate system is associated with the 2G service, the flowchart follows the "2G" branch from step 408. If the candidate system is associated with the 3G service, the flowchart follows the "3G" branch from step 408.

If the candidate system is associated with the 2G service ("2G" branch from step 408), the mobile station identifies whether it is currently operating with a 2G service or a 3G service (step 410). If the mobile station is currently operating with a 2G service ("2G" branch from step 510), the candidate system is added to the list of handoff candidates (step 414). If the mobile station is currently operating with a 3G service ("3G" branch from step 410), however, the candidate system is not included in the list. The mobile station identifies whether there are additional candidate systems to consider (step 416); if so, the flowchart continues again at step 404.

If the candidate system is associated with the 3G service ("3G" branch from step 408), the mobile station identifies whether data service was previously declined for the candidate system (step 412). If the candidate system did not previously decline the data service ("NO" branch from step 412), the candidate system is added to the list of handoff candidates (step 414). If the candidate system previously declined the data service ("YES" branch from step 412), however, the candidate system is not included in the list. The mobile station identifies whether there are additional candidate systems to consider (step 416); if so, the flowchart continues again at step 404.

If there are no other candidate systems to consider from step 416, the mobile station transmits a message that includes the list to the serving base station transceiver system (step 418). Subsequently, the network decides which base station transceiver system is most suitable for communication with the mobile station based on the identifiers in the list. The mobile station is then handed-off to and communicates with the selected base station transceiver system. As described above, the list may be transmitted in messages such as an Origination Message, a Page Response Message, and a Pilot Strength Measurement Message (PSMM), as examples.

Thus, according to the method of FIG. 4, one or more base station transceiver systems are identified for communication with a mobile station through a scanning process. The mobile station identifies a base station transceiver system that fails to provide a predetermined digital communication service. The mobile station produces and sends a list of one or more handoff candidate identifiers to a serving base station transceiver system which excludes an identifier for the base station transceiver system based on its failure to provide the predetermined digital communication service. Preferably, the predetermined digital communication service is a 3G or better communication service. Advantageously, even if a surrounding 2G base station transceiver system has a better signal quality, preference for an adequate 3G or better base station transceiver system is given to ensure that a preferred 3G service is made available to the mobile station.

Description will now be provided regarding how the mobile station identifies the type of communication service (e.g. 2G or 3G) that is provided for each base station transceiver system, and whether any 3G data service was actually previously denied for that base station transceiver system. In the methods described in relation to FIGS. 3 and 4, the mobile station stores and maintains a list of information in its memory corresponding to each base station transceiver system. A representative example of some of pertinent information regarding each base station transceiver system is represented in Table 1 below.

TABLE 1

List of base station system information stored in the mobile station, which includes an indication of the service type (e.g. 2G or 3G) associated with each system identifier.

| Base station transceiver system | System Identification (SID) | Frequency Number | PN Code | Service Type (e.g. 2G or 3G) | Previous 3G Service Denial ? |
|---|---|---|---|---|---|
| 1 | $SID_1$ | $f_1$ | $PN_1$ | 2G | N/A |
| 2 | $SID_2$ | $f_2$ | $PN_2$ | 3G | NO |
| 3 | $SID_3$ | $f_3$ | $PN_3$ | 3G | YES |
| 4 | $SID_4$ | $f_4$ | $PN_4$ | 2G | N/A |
| 5 | $SID_4$ | $f_4$ | $PN_5$ | 2G | N/A |
| 6 | $SID_4$ | $f_5$ | $PN_4$ | 3G | YES |
| ... | ... | ... | ... | ... | ... |
| N | $SID_N$ | $f_N$ | $PN_N$ | 3G | NO |

As shown in Table 1 above, information is stored and maintained for a plurality of N base station transceiver systems. In this embodiment, the base station transceiver systems represent the last twenty (20) base station transceiver systems encountered by the mobile station. That is, the list is continually updated by the mobile station over time to store information associated with the previous ten base station transceiver systems encountered. Although in this embodiment N=20, N may be any suitable number. As indicated in the table, the information associated with each base station transceiver system identifier includes a particular System Identification (SID), frequency number, and pseudorandom noise (PN) sequence code.

In addition, the stored list also associates a particular communication service type (e.g. 2G or 3G) for each base station transceiver system. When the mobile station encounters a new base station transceiver system that is not included in the list, the system is of an "unknown" communication service type. In that case, the mobile station may subsequently determine what communication service type is provided and update the table with the communication service type and other information.

The mobile station may identify or determine the communication service type (e.g. 2G or 3G) using any suitable technique. In the present embodiment, the mobile station determines what communication service type is available based on parameters transmitted from the base station transceiver system. In particular, some parameters broadcasted on a paging channel are indicative of the service communication type. In CDMA2000, for example, if the protocol revision (P_REV) broadcasted on the paging channel is greater than or equal to six (6), then the mobile station can assume that the base station transceiver system supports partial or full 3G services. Transmission of an "extended channel list message" by the base station transceiver system also serves as an indication that serving base station transceiver system supports partial or full 3G services. Again, however, any suitable technique to identify the communication service type may be utilized.

Final Comments. In the techniques described herein, one or more base station transceiver systems are identified for communication with the mobile station through a scanning process. A first base station transceiver system is identified as providing a 3G communication service or better, whereas a second base station transceiver system is identified as failing to provide the 3G or better communication service (e.g. it may provide a 2G communication service). The first system is selected for communication over the second system based at least in part on identifying that the second system fails to provide the 3G or better communication service. Advantageously, even if a surrounding 2G system has a better signal quality, preference for an adequate 3G or better system is given to ensure that a preferred data service (e.g. high speed packet data service or quick paging channel) is made available to the mobile station.

In another illustrative example of the present techniques, one or more base station transceiver systems are identified for communication with a mobile station through a scanning process. The mobile station identifies a base station transceiver system that fails to provide a predetermined digital communication service. The mobile station produces and sends a list of one or more handoff candidate identifiers to a serving base station transceiver system which excludes an identifier for the system based on its failure to provide the predetermined digital communication service. Preferably, the predetermined digital communication service is a 3G or better service. Advantageously, even if a surrounding 2G system has a better signal quality, preference for an adequate 3G or better system is given to ensure that a preferred data service (e.g. a packet data service) is made available to the mobile station.

The above-described embodiments of the present application are intended to be examples only. Those of skill in the art may effect alterations, modifications and variations to the particular embodiments without departing from the scope of the application. For example, although the above description refers to 3G as the preferred communication service, over time even better technologies will be implemented and referred to under a different name (e.g. 3.5G, 4G, etc.) and the invention embraces such technologies. Furthermore, some mobile stations may be operable to provide the same or similar preference or bias towards a 2G system over a 3G system. For example, a voice-only mobile station may prefer 2G over 3G since 2G service operation may provide a lower power consumption than 3G service operation. The invention described herein in the recited claims intends to cover and embrace all such changes in technology.

The invention claimed is:

1. In a mobile station connected to a first cellular base station transceiver system in a first Radio Access Technology (RAT), a method of selecting a cellular base station transceiver system for communication with the mobile station, the method comprising:
scanning to identify a second cellular base station transceiver system for communication in a second Radio Access Technology (RAT);
identifying, at the mobile station, that the second cellular base station transceiver system provides a predetermined communication service, and that the first cellular base station transceiver system fails to provide the predetermined communication service;
determining that a signal quality of the second cellular base station transceiver system is above a threshold signal quality, wherein the threshold signal quality is a constant; and
in response to the determining, causing the second cellular base station transceiver system to be selected for communication over the first cellular base station transceiver system;
wherein identifying whether the first cellular base station transceiver system fails to provide the predetermined communication service and the second cellular base station transceiver systems provides the predetermined communication service is based on identifying one or more parameters transmitted by at least one of the first and second cellular base station transceiver systems.

2. The method of claim 1, wherein the signal quality is based on an energy-to-interference ratio (EC/IO), the method further comprising:
measuring, from the scanning, a first EC/IO of the first cellular base station transceiver system; and
measuring, from the scanning, a second EC/IO of the second cellular base station transceiver system.

3. The method of claim 1, wherein the first radio access technology comprises one of a GSM/EDGE Radio Access Network (GERAN), Third Generation (3G) and Fourth Generation (4G) radio access technology.

4. The method of claim 1, wherein the second radio access technology comprises one of a GSM/EDGE Radio Access Network (GERAN), Third Generation (3G) and Fourth Generation (4G) radio access technology.

5. The method of claim 1, wherein the first radio access technology is a Fourth Generation (4G) Radio Access Technology, and the second radio access technology is one of a GSM/EDGE Radio Access Network (GERAN) or Third Generation (3G) Radio Access Technology.

6. The method of claim 1, wherein the first radio access technology is a Third Generation (3G) Radio Access Technology, and the second radio access technology is one of a GSM/EDGE Radio Access Network (GERAN) or Fourth Generation (4G) Radio Access Technology.

7. The method of claim 1, wherein the predetermined communication service comprises a voice communication service.

8. A mobile station connected to a first cellular base station transceiver system in a first Radio Access Technology (RAT), comprising:
a controller;
a radio frequency (RF) transceiver coupled to the controller;
the controller being configured to:
scan, with use of the RF transceiver, to identify a second cellular base station transceiver system for communication in a second Radio Access Technology (RAT);
identify that the second cellular base station transceiver system provides a predetermined communication service, and that the first cellular base station transceiver system fails to provide the predetermined communication service;
determine that a signal quality of the second cellular base station transceiver system is above a threshold signal quality, wherein the threshold signal quality is a constant; and
in response to the determining, cause the second cellular base station transceiver system to be selected for communication over the first cellular base station transceiver system;
wherein identifying whether the first cellular base station transceiver system fails to provide the predetermined communication service and the second cellular base station transceiver systems provides the predetermined communication service is based on identifying one or more parameters transmitted by at least one of the first and second cellular base station transceiver systems.

9. The mobile station of claim 8, wherein the signal quality is based on an energy-to-interference ratio (EC/IO), the method further comprising:
measuring, from the scanning, a first EC/IO of the first cellular base station transceiver system; and measuring, from the scanning, a second EC/IO of the second cellular base station transceiver system.

10. The mobile station of claim 8, wherein the predetermined communication service comprises a voice communication service.

11. The mobile station of claim 8, wherein the first radio access technology comprises one of a GSM/EDGE Radio Access Network (GERAN), Third Generation (3G) and Fourth Generation (4G) radio access technology.

12. The mobile station of claim 8, wherein the second radio access technology comprises one of a GSM/EDGE Radio Access Network (GERAN), Third Generation (3G) and Fourth Generation (4G) radio access technology.

13. The mobile station of claim 8, wherein the first radio access technology is a Fourth Generation (4G) Radio Access Technology, and the second radio access technology is one of a GSM/EDGE Radio Access Network (GERAN) or Third Generation (3G) Radio Access Technology.

14. The mobile station of claim 9, wherein the first radio access technology is a Third Generation (3G) Radio Access Technology, and the second radio access technology is one of a GSM/EDGE Radio Access Network (GERAN) or Fourth Generation (4G) Radio Access Technology.

15. A communication system, comprising:
a first cellular base station transceiver system in a first Radio Access Technology (RAT);
a second cellular base station transceiver system in a second Radio Access Technology (RAT);
one or more mobile stations operative for communications via the first and the second cellular base station transceiver system;
each mobile station being configured to:
scan to identify a second cellular base station transceiver system for communication;
identify that the second cellular base station transceiver system provides a predetermined communication service, and that the first cellular base station transceiver system fails to provide the predetermined communication service;
determine that a signal quality of the second cellular base station transceiver system is above a threshold signal quality, wherein the threshold signal quality is a constant;
in response to the determining, cause the second cellular base station transceiver system to be selected for communication over the first cellular base station transceiver system;
wherein identifying whether the first cellular base station transceiver system fails to provide the predetermined communication service and the second cellular base station transceiver systems provides the predetermined communication service is based on identifying one or more parameters transmitted by at least one of the first and second cellular base station transceiver systems.

16. The communication system of claim 15, wherein the predetermined communication service comprises a voice communication service.

17. The communication system of claim 15, wherein the first radio access technology comprises one of a GSM/EDGE Radio Access Network (GERAN), Third Generation (3G) and Fourth Generation (4G) radio access technology.

18. The communication system of claim 15, wherein the second radio access technology comprises one of a GSM/EDGE Radio Access Network (GERAN), Third Generation (3G) and Fourth Generation (4G) radio access technology.

19. The communication system of claim 15, wherein the first radio access technology is a Fourth Generation (4G) Radio Access Technology, and the second radio access technology is one of a GSM/EDGE Radio Access Network (GERAN) or Third Generation (3G) Radio Access Technology.

20. The communication system of claim 15, wherein the first radio access technology is a Third Generation (3G) Radio Access Technology, and the second radio access technology is one of a GSM/EDGE Radio Access Network (GERAN) or Fourth Generation (4G) Radio Access Technology.

* * * * *